J. R. SNYDER.
TRIPLE VALVE.
APPLICATION FILED AUG. 3, 1912.
1,097,058.
Patented May 19, 1914.
2 SHEETS—SHEET 2.
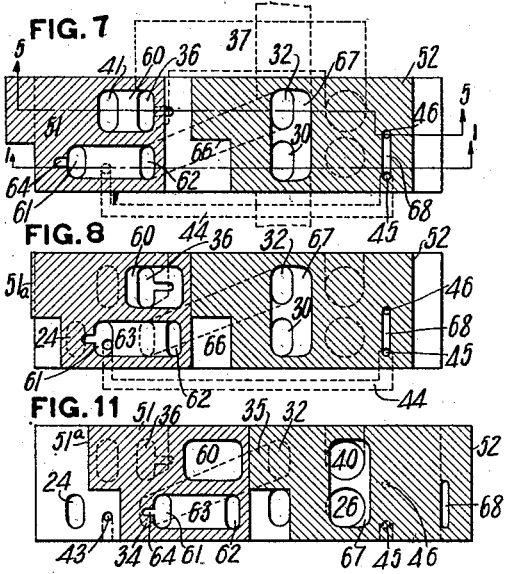
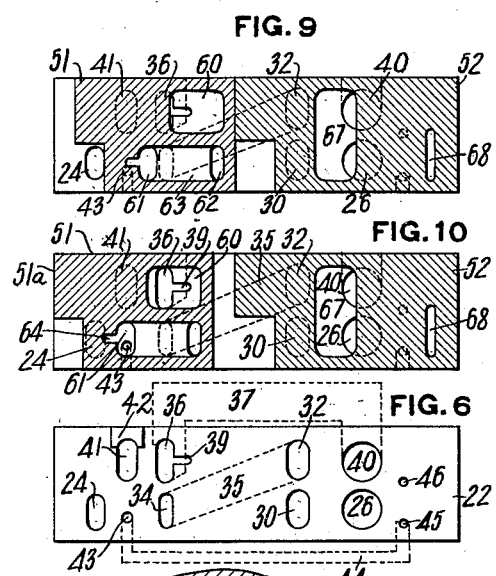
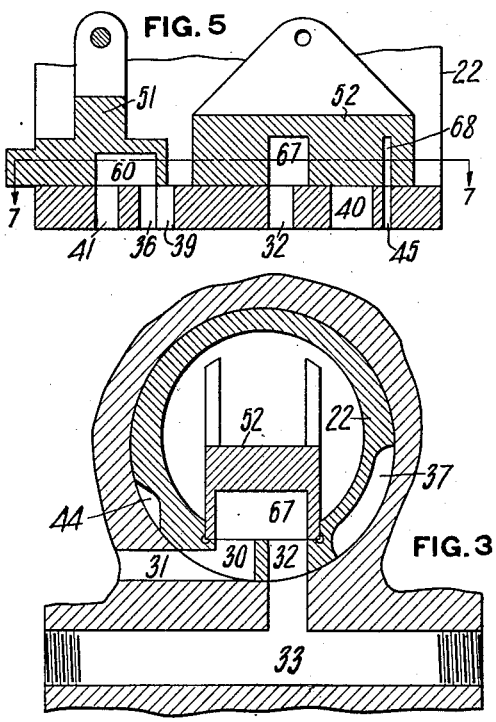
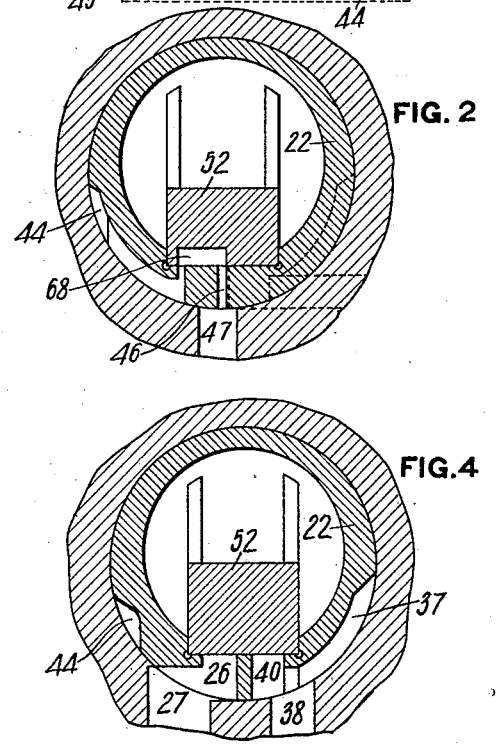
WITNESSES
INVENTOR
Jacob Rush Snyder,
By Fred'k W. Winter,
Attorney
COLUMBIA PLANOGRAPH CO., WASHINGTON, D. C.

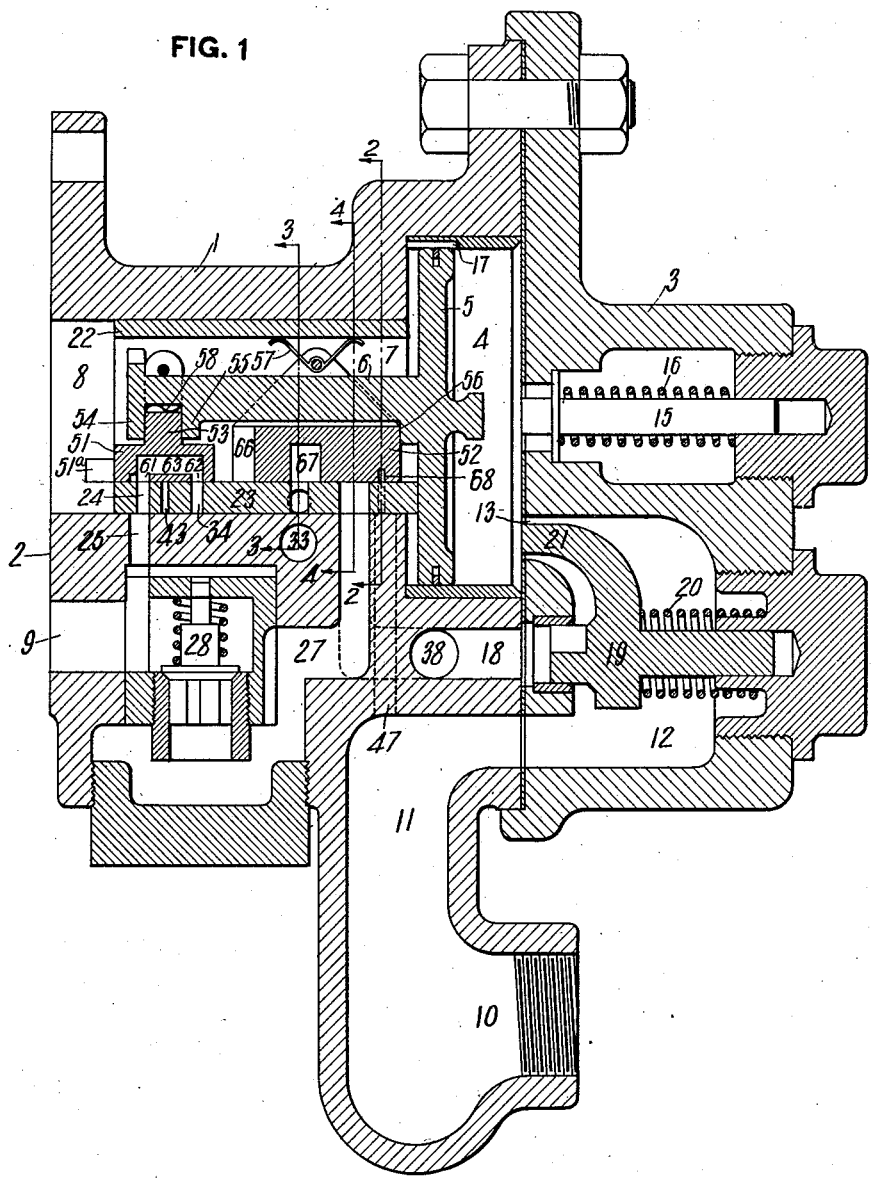

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

TRIPLE VALVE.

1,097,058.  Specification of Letters Patent.  Patented May 19, 1914.

Application filed August 3, 1912. Serial No. 713,052.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems, and more particularly to triple valves for use on freight or other long trains.

The object of the invention is to provide a triple valve which effects and performs all of the usual functions of modern triple valves by much simpler and less complicated mechanical means than are embodied in present freight triple valves, and which particularly effects a substantially simultaneous release of the brakes throughout the train by providing at each car for the admission of a stored fluid pressure medium to the train pipe to increase the train pipe pressure in a series of waves, and thereby secure the necessary increase in train pipe pressure to release the brakes at the rear end of the train more quickly than if the fluid pressure medium necessary therefor had to flow from the main reservoir on the engine the length of the entire train.

The invention comprises the construction and arrangement of the parts of a triple valve hereinafter described and claimed.

In the accompanying drawings Figure 1 is a longitudinal sectional view through a triple valve embodying the invention taken substantially on the line 1—1, Fig. 7 and showing the same in full and quick release position; Figs. 2, 3 and 4 are vertical transverse sections taken respectively on the lines 2—2, 3—3 and 4—4, Fig. 1; Fig. 5 is a longitudinal sectional view through the valve seat and slide valves coöperating therewith taken on the line 5—5, Fig. 7, the valves being in full and quick release position; Fig. 6 is a plan view of the valve seat; and Figs. 7, 8, 9, 10 and 11 are views showing the valve seat in plan and the valves in horizontal section on the line 7—7, Fig. 5, and showing different positions of the valve, Fig. 7 showing the same in full and quick release position, Fig. 8 in quick service or quick serial application position, Fig. 9 in full service position, Fig. 10 in service lap position, and Fig. 11 in emergency application position.

The valve in its general form, construction and arrangement follows the standard type of Westinghouse and similar valves. It comprises a casing 1 provided at one end with a flat face 2 adapted for connection to the auxiliary reservoir and brake cylinder, and is closed at its opposite end by the cap or head 3 secured to the casing by compression bolts, all as is usual in standard freight triple valves. In the casing is the usual chamber 4 in which works the piston 5 provided with a stem 6 extending into the bore 7 of the casing and actuating the slide valves. The auxiliary reservoir connection is at 8 and the service brake cylinder connection at 9. Brake or train pipe connection 10 communicates through passage 11 with the chamber 12 in the head or cap 3 and which chamber communicates at 13 with piston chamber 4. In the head 3 is the usual graduating stem 15 surrounded by graduating spring 16 for controlling the movement of the main piston to service and emergency application positions, as is usual in triple valves. The bushing of chamber 4 is also provided with the usual auxiliary reservoir feed or charging groove 17.

From the chamber 12 a passage 18 leads through the casing 1 to a port in the valve seat hereinafter to be described, which passage 18 is controlled by a check valve 19 normally seated by spring 20 away from the train pipe and provided with a curved arm 21 projecting through the opening 13 into piston chamber 4 and arranged to be contacted by piston 5 when the latter moves to emergency position and thereby unseat check valve 19 against the resistance of spring 20. In the bore 7 of the valve is a suitable bushing 22 whose lower portion forms a valve seat 23 which is provided with the ports and passages shown in Figs. 1, 2, 3, 4, 5, 6 and 7, as follows: a port 24 near one end of the seat communicating with port 25 through the casing leading directly to the service brake cylinder connection 9; a port 26 located near the opposite end of the seat and longitudinally in line with port 24 and communicating through passage 27 in the casing with service brake cylinder connection 9, a spring loaded check valve 28 seating away from the brake cylinder being in said passage; a port 30 between ports 24 and 26 and relatively near port 26 and communicating with a lateral passage 31 arranged to be connected to the emergency brake cylinder; a port 32 laterally in line with port 30 and communicating with passage 33 leading to the atmosphere and forming the exhaust; a port 34 longitudinally in line with ports 24 and 30 and connecting with exhaust port 33 by a passage 35 in the seat; a port 36 laterally in line with exhaust port 34 and communicating through a passage 37 formed in the outer face of the bushing with a port 38 through the casing and leading to the passage 18 having communication with the train pipe through check valve 19, port 36 being provided with a longitudinal extension 39; a port 40 laterally in line with service brake cylinder port 26 and longitudinally in line with port 36 and also communicating with the port 38 leading to the train pipe passage 18; a port 41 communicating with a lateral passage 42 adapted to be connected with a supplementary reservoir; a small port 43 in proximity to service brake cylinder port 24 and communicating through passage 44 formed in the outer face of the bushing 22 with a small port 45 near the opposite end of the seat; and a small port 46 laterally in line with port 45 and communicating with port 47 extending through the valve casing to train pipe passage 11.

Coöperating with the valve seat are two slide valves, to-wit: a relatively small slide valve 51 and a larger slide valve 52. The valve 51 is provided with an upwardly projecting portion which fits between an end projection 54 and an intermediate projection 53 on the piston stem 6 so that said valve 51 at all times moves with the piston 5. The larger slide valve 52 is held between the outer end of small valve 51 and a shoulder 56 on the piston stem, but does not fill the space between these abutments so that there is a certain amount of lost motion which permits the piston 5 and valve 51 to move at times without moving valve 52. The valve 52 is held to the seat 23 by the usual spring 57 while the small slide valve 51 is held to the seat by means of a spring 58 interposed between the top of its projection 53 and the top wall of the recess in the valve stem 6 into which said projection extends.

The valve 51 in plan view is of general L-shape comprising a main body portion with a tail 51ª at its inner end at one side. In its bottom face said valve is provided near one side with a comparatively large and wide cavity 60 and near its opposite side with a pair of ports 61 and 62 connected by the cored out or similarly formed passage 63. The port 61 is provided with a narrow longitudinal extension 64.

The slide valve 52 is of general rectangular form, has one corner cut away as at 66 and in its lower face is provided with a pair of transverse cavities, to-wit: a large and relatively wide cavity 67 substantially midway between the ends of said valve and a narrow transverse cavity 68 near the outer end of said valve.

The valve has five positions, as follows:

1. *Full and quick release position.* (Shown in Figs. 1, 2, 3, 4, 5 and 7.)—In this position the main piston 5 has been driven fully over to the left uncovering recharging or feed groove 17, thereby permitting train pipe pressure to flow to the bore 7 of the valve and thence to auxiliary reservoir. The slide valves 51 and 52 are in such position, shown in Fig. 7, that service brake cylinder port 24 in the valve seat registers with port 61 in slide valve 51 while port 62 of said valve registers with exhaust port 34, while the large cavity 67 of valve 52 connects emergency brake cylinder port 30 with exhaust port 32. Consequently, both brake cylinders are exhausted to the atmosphere. Cavity 68 of slide valve 52 also connects train pipe port 46 with port 45, but the small port 43 is blanked by valve 51 so that the train pipe air has no escape. Cavity 60 in valve 51 connects supplementary reservoir port 41 with train pipe port 36 and consequently supplementary reservoir air flows through passage 37 to port 38, thence to passage 18 and unseats check valve 19 and escapes into the train pipe, thereby supplying the train pipe at the car with air for a short time and creating an increased wave of pressure at the car to flow toward the rear of the train. It will be understood that this action takes place after an application of the brakes when the auxiliary reservoir pressure is low, while the supplementary reservoir pressure is high, having been trapped as will hereinafter appear, so that the supplementary reservoir pressure is sufficient to unseat valve 19 against the increased train pipe pressure necessary to move the piston 5 and valves to release position. Consequently, this supplies the train pipe with air at each car to secure a quick serial action of the valves throughout the train to release the brakes, and gives such a substantial simultaneous release of the brakes from end to end of the train as meets all practical purposes. It has the same effect in the release of the brakes as the venting of the train pipe at each car has in application positions to secure a quick serial application action of the brakes. The end of the longitudinal extension 39 of train pipe port 36 is also uncovered, so that as the auxiliary reservoir charges (which occurs after the brakes throughout the train have been fully released) air may enter through the exposed end of extension 39 and pass thence through cavity 60 to supplementary reservoir port 41, thereby charging the supplementary reservoir at the same time and to the same pressure as the auxiliary reservoir.

2. *Quick service position.* (Shown in Fig. 13.

8.)—This position is assumed upon a slight reduction of train pipe pressure and upon the first movement of the piston 5 which results in moving the small slide valve 51 from the position shown in Fig. 7 to that shown in Fig. 8, but without moving the large valve 52 due to lost motion connection between the latter and the piston stem. In this position the connection between the brake cylinder port 24 and exhaust port 34 is broken, but port 61 with its longitudinal extension 64 connects brake cylinder port 24 with small port 43, and as ports 45 and 46 are still connected by cavity 68 of slide valve 52, train pipe air passes from port 46 to the brake cylinder port 24, thereby momentarily venting the train pipe to the brake cylinder to produce a drop of pressure in the train pipe at the car and secure a quicker serial action of the valves throughout the train than would be possible if all the air had to flow forward and out at the engineer's brake valve. The valve remains in this position for a brief time due to the fact that the first movement of the piston 5 moves only small slide valve 51, but as soon as the lost motion connection between piston stem 6 and large slide valve 52 is taken up the greater frictional resistance then encountered checks the movement of the piston and, therefore, provides an appreciable time for venting the train pipe into the empty brake cylinder. The reduction of train pipe pressure caused by this venting unbalances the pressures on opposite sides of the piston 5 sufficiently to overcome the frictional resistance of both slide valves, so that the latter almost immediately move to the next position now to be described.

3. *Full service position.* (Shown in Fig. 9.)—In this position the slide valves have been moved to the right sufficiently so that valve 51 uncovers service brake cylinder port 24 thereby allowing auxiliary reservoir pressure to rush into the brake cylinder. The cavity 67 in slide valve 52 connects train pipe port 40 with service brake cylinder port 26, but no air will flow through this connection because the check valve 19 seats toward the brake cylinder. All other ports are blanked. In this position the head of piston 5 is in contact with graduating stem 15, the graduating spring 16 checking the movement of the piston and valves in the usual way to stop the valve in service position. The spring 20 is of such strength that upon the initial reduction of train pipe pressure for service applications, it will not allow check valve 19 to open, and hence the supplementary reservoir is prevented from venting to the train pipe. As soon as the slide valves have moved slightly in going to service application position, the connection between the supplementary reservoir and train pipe is cut off.

4. *Service lap position.* (Shown in Fig. 10.)—This position is assumed by the valve on a slight recoil such as occurs immediately after a service application, due to a momentary excess of pressure in the train pipe side of the piston 5. The large slide valve 52 remains stationary, due to the lost motion connection between itself and the piston stem, but the small slide valve 51 is moved inwardly sufficiently to blank the service brake cylinder port 24, thereby cutting off the flow of further air from the auxiliary reservoir to said brake cylinder, but maintaining the pressure in said brake cylinder. All other ports remain blanked.

5. *Emergency application position.* (Shown in Fig. 11.)—This position is assumed upon a large reduction of train pipe pressure so that auxiliary reservoir pressure pushes piston 5 entirely over to the right and compresses graduating spring 16. In this position the slide valves have moved so as to fully uncover service brake cylinder port 24 and emergency brake cylinder port 30 and permit auxiliary reservoir pressure to rush into both brake cylinders. In addition, the piston 5 has contacted with bent arm of check valve 19, thereby unseating said valve against the resistance of spring 20 and permitting train pipe pressure to flow from passage 11 to passage 18 and thence to passage 38, and thence to port 40 in the valve seat. At the same time, cavity 67 of slide valve 52 connects port 40 with service brake cylinder port 26 so that the train pipe pressure can flow through passage 27, lifting check valve 28 in its passage, and thence to the service brake cylinder. Consequently, the service brake cylinder is supplied with air from both the auxiliary reservoir and the train pipe to secure a strong setting of the brakes and also venting the train pipe at each car to secure a quick serial action of the valves throughout the train. As soon as the brake cylinder pressure balances with train pipe pressure, check valve 28 closes and thereafter the application is completed by the equilization of auxiliary reservoir pressure into the two brake cylinders.

The emergency position of the valve can be secured either directly from the full release position or from any of the other positions of the valve by merely reducing the train pipe pressure below the point of equalization of auxiliary reservoir pressure in the brake cylinder.

It will be observed that in all positions of the valve, except full and quick release position, the supplementary reservoir port 41 is blanked. Consequently, the air in the supplementary reservoir is trapped at its pressure of charging and is available to flow to the train pipe when the valve is in full and quick release position. This flow of air from the supplementary reservoir to the train pipe is only brief, for as soon as the train pipe pressure throughout the train builds up to the desired point, the check valve 19 seats and thereafter the auxiliary and supplementary reservoirs charge to the maximum pressure carried by the train pipe during running. The triple valve remains in the same position during running as in full and quick release, but obviously the check valve 19 remains open only for a short time, just as the triple valve is forced to full and quick release position after an application of the brakes and while the train pipe is still somewhat depleted in pressure.

By supplying air to the train pipe at each car, a release of the brakes throughout the train can be secured by merely admitting sufficient air at the engine to increase the pressure in that portion of the train pipe between the engine and the first car sufficiently to push the triple valve on said first car to full release position, the necessary increase of pressure in the train pipe from the first car to the second car being supplied automatically at the first car from the stored supply on the first car. In this way only a small amount of air need be withdrawn from the main reservoir, just sufficient to release the brakes on the first car, after which the release of the brakes throughout the train takes place automatically by air supplied at each car for releasing the triple valve on the next succeeding car, and so on, thereby securing a very quick serial action of the triple valves to release position throughout the length of the train, and securing such substantial simultaneity of release from end to end of the train as to serve all practical purposes and prevent tearing the train in two and other difficulties which have been caused by the dragging of the brakes on the rear end of the train.

In case the supplementary reservoir pressure is desired for use in emergency applications, it is merely necessary to omit the tail 51ᵃ of valve 51, which will result in uncovering supplementary reservoir port 41 when the valve is in emergency position. This would have the effect of depleting the supplementary reservoir so that it would not be available for quick release of the brakes after an emergency application, but this would not be a serious detriment because emergency applications are seldom made, and furthermore, usually the train is brought to a stand-still in an emergency application so that quick release of the brakes after such application is not particularly important.

What I claim is:

1. In a fluid pressure brake, a valve device having connections for the train pipe, a brake cylinder, an auxiliary reservoir, and a supplementary reservoir, said valve device comprising a movable abutment operated by variations in train pipe pressure, and a valve actuated thereby, said valve and its seat having ports and passages arranged upon service reduction in train pipe pressure to close communication to the supplementary reservoir and trap the air therein and upon increase in train pipe pressure to move to normal release and running position and simultaneously open communication from the supplementary reservoir to the train pipe.

2. In a fluid pressure brake, a valve device having connections for the train pipe, a brake cylinder, an auxiliary reservoir, and a supplementary reservoir, said valve device comprising a movable abutment operating under variations in train pipe pressure, and a valve connected thereto, said valve and its seat being provided with ports and passages arranged upon service reduction of train pipe pressure to close communication to the supplementary reservoir and trap the air therein and upon increase in train pipe pressure to move the normal release and running position and simultaneously open communication from the supplementary reservoir to the train pipe and from the brake cylinder to the atmosphere and also open a charging communication from the train pipe to both reservoirs.

3. A triple valve having connections to the train pipe, a brake cylinder, an auxiliary reservoir, a supplementary reservoir and the atmosphere, a movable abutment actuated by variations in train pipe pressure, and a valve device actuated by said movable abutment and arranged in service positions of the valve to close communication to the supplementary reservoir and trap the air therein, and upon increase in train pipe pressure in moving to normal release and running position to open communication from the supplementary reservoir to the train pipe.

4. A triple valve having connections to the train pipe, a brake cylinder, an auxiliary reservoir, a supplementary reservoir, and the atmosphere, a movable abutment actuated by variations in train pipe pressure, a pair of valves actuated by said abutment and having relative movement one to the other, one of said valves being arranged in full release position to open communication from the brake cylinder to the atmosphere and from the supplementary reservoir to the train pipe, and the other valve in full release position connecting the train pipe with a passage leading underneath the first valve, whereby on initial movement of the first valve communication is established momentarily from the train pipe to the brake cylinder.

5. A triple valve having connections to the train pipe, a brake cylinder, an auxiliary reservoir, a supplementary reservoir and the atmosphere, a movable abutment actuated by variations in train pipe pressure, a pair of valves actuated by said abutment and having relative movement one to the other, one of said valves being arranged in full release position to open communication from the brake cylinder to the atmosphere and from a supplementary reservoir to the train pipe, and the other valve in emergency position controlling communication from the train pipe to the brake cylinder.

6. In a triple valve, a valve seat provided with two ports communicating with a brake cylinder and a port communicating with the train pipe, a valve coöperating with said seat and provided with a cavity arranged in emergency position of the valve to connect said train pipe and one of said brake cylinder ports, a movable abutment actuated by variations in train pipe pressure for operating said valve, and a check valve in the train pipe port connection seating away from the train pipe and arranged to be opened by said movable abutment in emergency position.

7. In a triple valve, a valve seat provided with a pair of ports communicating with a brake cylinder, an exhaust port and a port communicating with the train pipe, and a pair of slide valves coöperating with said seat and having movement relative to one another, one of said valves being provided with a cavity arranged in release position to connect one of the brake cylinder ports with the exhaust port and in service and emergency positions to open the brake cylinder port to the auxiliary reservoir, and the other of said valves being provided with a cavity arranged in emergency position to connect the train pipe port with the other brake cylinder port.

8. In a triple valve, a valve seat provided with a service brake cylinder port, an emergency brake cylinder port, and a pair of exhaust ports, one in proximity to each of said brake cylinder ports, and a pair of slide valves coöperating with said seat and having movement relative to one another, one of said valves being provided with a cavity arranged in release position to connect the service brake cylinder port with one of the exhaust ports, and the other of said valves being provided with a cavity arranged in release position to connect the emergency brake cylinder port with the other exhaust port, the first named valve being arranged in both service and emergency positions to open the service brake cylinder port to the auxiliary reservoir, and the second named valve being arranged in service position to blank the emergency brake cylinder port, and in emergency position to open said emergency brake cylinder port to the auxiliary reservoir.

9. In a triple valve, a valve seat provided with a pair of ports communicating with a service brake cylinder, a port communicating with an emergency brake cylinder, a port communicating with a supplementary reservoir, a port communicating with the train pipe, and a pair of exhaust ports, and a pair of slide valves coöperating with said seat and having movement relative to one another, one of said slide valves being arranged in full release position to connect one of the service brake cylinder ports with one of the exhaust ports and to connect the supplementary reservoir port with the train pipe port, and in service and emergency positions to open said service brake cylinder port to the auxiliary reservoir and blank the supplementary reservoir port, and the other of said valves being provided with a cavity and arranged in release position to connect the emergency brake cylinder port with the other exhaust port and blank the other service brake cylinder port, and in emergency position to open the emergency brake cylinder port to the auxiliary reservoir.

10. In a triple valve, a valve seat provided with a pair of ports communicating with a service brake cylinder, a port communicating with an emergency brake cylinder, a port communicating with a supplementary reservoir, a pair of ports communicating with the train pipe, and a pair of exhaust ports, and a pair of slide valves coöperating with said seat and having movement relative to one another, one of said valves being arranged in full release position to connect one of the service brake cylinder ports with one of the exhaust ports and to connect the supplementary reservoir port with one of the train pipe ports, and in service and emergency positions to open said service brake cylinder port to the auxiliary reservoir and blank the supplementary reservoir port, and the other of said valves being provided with a cavity and arranged in relief position to connect the emergency brake cylinder port with the other exhaust port and blank the other train pipe port and the other service brake cylinder port, and in emergency position to connect the second train pipe port with the second service brake cylinder port and open the emergency brake cylinder port to the auxiliary reservoir.

11. In a fluid pressure brake, a valve device having connections for the train pipe, a brake cylinder, and a reservoir on a car, said valve device comprising a movable abutment operating under variations of train pipe pressure, and a valve actuated thereby and being arranged under an increase in train pipe pressure to open the brake cylinder exhaust and simultaneously connect the reservoir to the train pipe, and a check valve in said last named connection seating toward said reservoir.

12. A triple valve mechanism having connections to the train pipe, a reservoir on a car, a brake cylinder, and to the atmosphere, and comprising a movable abutment operating under variations in train pipe pressure, and a valve actuated thereby and arranged in moving to release position under increase of train pipe pressure to open a communication from said reservoir to the train pipe, and a check valve in said last named connection seating toward said reservoir.

13. A triple valve mechanism having connections to the train pipe, a brake cylinder, the atmosphere and a reservoir on a car, and comprising a movable abutment operated by variations in train pipe pressure and a valve device operated directly by said movable abutment and arranged in moving to release position to open a connection from said reservoir to the train pipe, and a check valve in said connection seating toward said reservoir.

14. A triple valve mechanism having connections to the train pipe, a brake cylinder, an auxiliary reservoir, a supplementary reservoir, and the atmosphere, and including a movable abutment actuated by variations in train pipe pressure, a valve device actuated by said movable abutment and arranged upon reduction of train pipe pressure to close communication from the supplementary reservoir and upon increase in train pipe pressure to move to release position and also open a connection from the supplementary reservoir to the train pipe, and a check valve in said connection seating toward the supplementary reservoir.

15. A triple valve mechanism having connections to the train pipe, a brake cylinder, the atmosphere, and a reservoir on a car, and comprising a movable abutment operated by variations in train pipe pressure and a valve device operated by said movable abutment and arranged on an increase of train pipe pressure to connect the brake cylinder to the atmosphere and open a connection from said reservoir to the train pipe, a check valve in said connection spring seated toward said reservoir, and means arranged when said valve device moves to emergency position to unseat said check valve.

In testimony whereof, I have hereunto set my hand.

JACOB RUSH SNYDER.

Witnesses:
 J. L. TREFALLER, Jr.,
 ELBERT L. HYDE.